Aug. 26, 1930. J. A. GARDNER ET AL Re. 17,783
CENTRIFUGAL CASTING MACHINE
Original Filed March 4, 1927
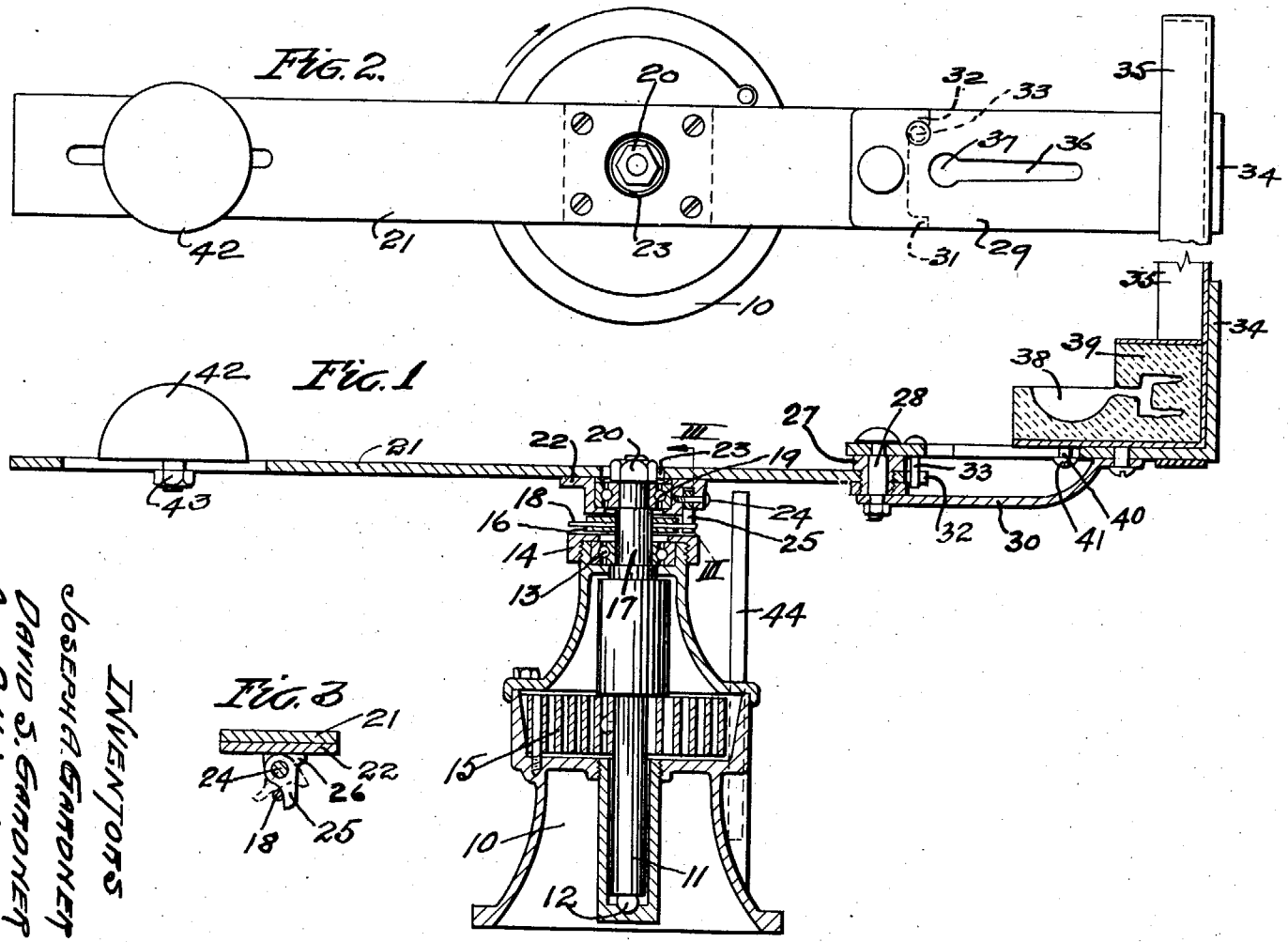
INVENTORS
JOSEPH A. GARDNER
DAVID S. GARDNER
by J. H. Weatherford
ATTORNEY.

Reissued Aug. 26, 1930 Re. 17,783

UNITED STATES PATENT OFFICE

JOSEPH A. GARDNER AND DAVID S. GARDNER, OF MEMPHIS, TENNESSEE

CENTRIFUGAL CASTING MACHINE

Original No. 1,694,504, dated December 11, 1928, Serial No. 172,874, filed March 4, 1927. Application for reissue filed June 21, 1930. Serial No. 462,920.

In the casting of very small articles of gold or other similar and particularly highly refractory metals, such for instance as metal inlays for dental work, jewelry, etc., difficulty is experienced in transferring the metal from the crucible to the mold quickly enough and with sufficient force to cause the metal to flow into the delicate parts. These difficulties have been partially solved by what are known as centrifugal casting machines, in which the mold is placed on a rotatable arm and a crucible located on the same arm, between the mold and the center of rotation, and in which after the metal in the crucible has been sufficiently heated, the arm is caused to rotate rapidly and the metal to thereby be thrown into the mold centrifugally. In these machines however, many incidental points are as yet unsolved or only crudely solved and it is to these points that our invention is largely directed.

Among these points are, first, that while the finer parts of the casting are taken care of by the centrifugal action, the amount of rotation securable by the spring action ordinarily used, is insufficient to provide a duration of rotation which will permit the larger parts of the casting to solidify before it ceases, and therefore releases have been interposed which permit the arm to rotate after the spring action is spent.

Second, the crucible and mold is ordinarily heated and the metal melted before these parts are placed on the arm, and means for effecting quick and positive attachment of the crucible and mold must be provided; and Third, the motion imparted to the arm being sudden and powerful, provision should be made for positioning the crucible and mold so that the initial tagential motion may be utilized, but these parts being the heavier parts and at the end of the arm, provision should be made for accomplishing rigidity after they have taken up a radial position in order to effectually utilize their inertia and keep the arm in balance.

The objects of this invention are, and this invention relates, (1) To means for reducing the frictional relation between the parts initiating motion and those continuing the rotation after the power of the motor has been spent; such object primarily being accomplished by placing the locking and releasing means at the point of ultimate attachment of the arm to the source of power;

(2) To means for effecting the quick and secure attachement of the crucible and mold parts to the arm;

(3) To means for limiting the movement of the mold carrying arm initially to a tangential position, and thereafter to a radial position; and (4) To means for improving generally, the construction of such a machine.

The means by which the foregoing and other objects are accomplished, and the manner of their accomplishment, will readily be understood from the following specification, on reference to the accompanying drawings, in which,—

Fig. 1 is a sectional side elevation of the machine with crucible and mold in place.

Fig. 2 is a plan view, with the crucible and mold removed, and

Fig. 3 is a fragmentary sectional side elevation on the line III—III of Fig. 1, showing the releasing pawl.

Referring now to the drawings in which the various parts have been indicated by numerals,—10 is a casing in which is mounted a vertical shaft 11, supported at its lower end on a ball 12, and provided near its upper end with a ball bearing assembly 13, the inner portion of which is secured on the shaft and the outer portion in the upper portion of the casing. 14 is a retaining cap securing the bearing in the casing. 15 is a flat coil spring, one end of which is secured in any desired manner to the shaft and the other to the casing.

16 is a collar, secured above the bearing 13, to the portion 17 of the shaft, by a pin 18, passing through the shaft and collar and projecting laterally therebeyond. Above the section 17 the shaft is reduced in diameter to form a shoulder against which the inner portion of a ball-bearing assembly 19 is forced and secured to the shaft by a nut 20.

21 is the throwing arm, to which is secured, in any desired manner, a retaining member 22 into which the outer half of the ball-bearing assembly 19 has been forced. 23 is a hole in the arm through which the nut 20 projects. Projecting laterally from the member 22 is a pin 24 on which a pawl 25 is hinged and depends into the path of the pin 18. This pawl as will be seen by reference to Fig. 3 swings upward to permit its passage over the pin in one direction, when the pawl moves to the right in that view, but is restrained by the shoulder 26 from swinging in the opposite direction, so that it will engage the pin when the pawl is moved to the left in winding, or be engaged by the pin when the latter is moved to the right by the spring action.

Secured to one end of the throwing arm 21 is a bearing 27, through which passes a pin 28 rigidly secured in one end of an oscillatable extension 29 of the throwing arm, thus providing for the extension of a pivotal support, but one substantially rigid against vertical movement. 30 is a brace secured to the extension and bracing against the lower end of the pin 28 to give additional rigidity to that member. 31, 32 are lugs or stops on the arm 21, and 33 is a pin secured in, and depending below, the extension 29 which pin engages the lug 31 to determine a position of the arm tangential to the circle of movement of the pin 28, and which pin likewise engages the lug 32 to determine a true radial position of the extension.

The end 34 of the extension arm 29, is preferably turned upwardly at right angles to the arm to form a stop or abutment. A shield 35 may be secured thereto and form a part of the stop. 36 is a slot in the arm having an enlarged eye 37 located at the inner end of the slot. Preferably this slot is slightly wider at its inner end than its outer end. 38 is the crucible and 39 the mold, preferably made integral and provided with a pin 40, projecting downward therefrom, the pin having an enlarged head 41, which is smaller than the eye 37 but larger than the slot 36. This provides a means for quickly and solidly attaching the crucible and mold to the arm, by slipping the head 41 of the pin through the eye 37 and then moving the crucible and mold radially outward until the end of the mold abuts solidly against the stop 35. The tapered slot allows at the same time a minor wedging action of the pin 40 against the slot sides, but such wedging should not be sufficient to prevent the mold from seating firmly against the stop. Where longer crucible-mold assemblies are used, a larger pin may be used in order to get a similar wedging action at a point more remote from the stop. It will be seen that not only is the mold quickly and firmly engaged, but centrifugal force of the machine when in use additionally tends to make the attachment more secure.

42 is a weight adjustably secured to the opposite end of the throwing arm, which weight may be moved inward or outward until it balances the weights on the opposite arm-end and thereafter be secured by tightening the nut 43.

44 is a pin, vertically slidable in the casing 10, which may be raised upward into the path of the arm 21 to form a stop therefor, should same be desired. The casing 10 may be secured to any suitable support in any desired manner.

In use the weight 42 is adjusted to the proper location to balance the particular crucible and mold to be used and these, after the metal has first been melted in suitable apparatus, are engaged with the slotted arm 29, with the mold firmly seated against the stop. The arm 21 is then turned in the direction of the arrow A in Fig. 2, until the spring 15 is wound up. During such winding the pin 33 moves the extension arm in the same direction of rotation and prevents its swinging in the wrong direction. After winding, the arm 21 is released and the spring allowed to rotate it rapidly in the reverse direction. At the start of such reverse motion, the mold tends by inertia to lag behind and the extension arm assumes a tangential instead of radial position. At such time the pin 33 engaging the lug 31 prevents the arm from swinging too far inward. After the parts have been set in full motion the extension arm again assumes a radial position, the metal in the crucible thus being, at all parts of the movement, impelled toward the mold.

When the spring has spent its force, the arm continues to revolve, the ball-bearing 19 substantially eliminating friction and the pawl 25, Fig. 3, riding over the pin 18 with a minimum of resistance, so that with the arm mounted for rotation at the ultimate point of connection with the shaft, friction is practically eliminated and rotation will continue for a very considerable period, thus allowing the metal in the mold to cool and solidify while still under centrifugal pressure. During this period too, the pin 33 engaging the lug 32 prevents the mold end of the arm from over-running the remainder thereof and in maintaining them in alignment, maintains them in balance.

It will of course be understood that the drawings are illustrative only, and that various modifications may be made in the details of construction without departing from the spirit of our invention. We therefore, wish it distinctly understood that we do not wish to limit ourselves to the details herein shown and described, except as same may be specifically hereinafter set out in the claims.

Having thus disclosed our invention, what we claim is:—

1. A casting apparatus comprising a vertical shaft, means for driving said shaft during a limited period, a mold carrying arm mounted for free rotation on the extreme upper end of said shaft, a pin projecting from said shaft, a pawl carried by said arm, depending into the path of said pin during action of said driving means, and over riding said pin when driving action is spent.

2. A casting apparatus, comprising a rotatable arm, an extension arm pivoted thereto and means for limiting the swing of said extension arm, comprising oppositely disposed lugs projecting longitudinally from said rotatable arm, and a pin projecting from said extension arm and disposed between said lugs.

3. A casting apparatus, including a rotatable arm, an extension arm pivoted thereto, and means carried by one of said arms, cooperating with the other thereof, for limiting the swing of said extension arm away from alignment with said rotatable arm to determine initial angular positioning of said arm.

4. A casting apparatus, including a rotatable arm, an extension arm pivoted thereto, and a stop carried by one of said arms, cooperating with the other thereof, for limiting the swing of said extension arm away from alignment with said rotatable arm to determine initial angular positioning of said arm.

5. A casting apparatus, including a rotatable arm, an extension arm pivoted thereto, and a stop carried by one of said arms, cooperating with the other thereof, for limiting the swing of said extension arm away from alignment with said rotatable arm to an initial position substantially at right angles to said rotatable arm.

6. A casting apparatus, including a rotatable arm, an extension arm pivoted thereto, and means carried by one of said arms cooperating with the other thereof, for limiting the swing of said extension arm between a position in alignment with said rotatable arm, and an initial position at an angle thereto.

7. A casting apparatus, including a rotatable arm, an extension arm pivoted thereto, and a stop carried by one of said arms, cooperating with the other thereof, for limiting the swing of said extension arm between a position in alignment with said rotatable arm and an initial position substantially at right angles thereto.

In testimony whereof we have hereunto set our names.

JOSEPH A. GARDNER.
DAVID S. GARDNER.